United States Patent
Kuusela et al.

(10) Patent No.: US 12,485,292 B2
(45) Date of Patent: Dec. 2, 2025

(54) MACHINE LEARNING PREDICTION OF DOSE VOLUME HISTOGRAM SHAPES

(71) Applicant: Siemens Healthineers International AG, Steinhausen (CH)

(72) Inventors: Esa Kuusela, Espoo (FI); Mikko Hakala, Rajamaki (FI); María Isabel Cordero-Marcos, Espoo (FI); Elena Czeizler, Helsinki (FI); Shahab Basiri, Siuntio (FI); Hannu Laaksonen, Espoo (FI)

(73) Assignee: Siemens Healthineers International AG, Steinhausen (CH)

( * ) Notice: Subject to any disclaimer, the term of this patent is extended or adjusted under 35 U.S.C. 154(b) by 735 days.

(21) Appl. No.: 17/854,270

(22) Filed: Jun. 30, 2022

(65) Prior Publication Data

US 2024/0001139 A1   Jan. 4, 2024

(51) Int. Cl.
*A61N 5/04* (2006.01)
*G06N 20/00* (2019.01)
*A61N 5/10* (2006.01)

(52) U.S. Cl.
CPC ............. *A61N 5/045* (2013.01); *G06N 20/00* (2019.01); *A61N 5/1031* (2013.01)

(58) Field of Classification Search
CPC ........ A61N 5/04; A61N 5/045; A61N 5/1031; G06N 20/00
See application file for complete search history.

(56) References Cited

U.S. PATENT DOCUMENTS

| | | |
|---|---|---|
| 2020/0171325 A1 | 6/2020 | Yang et al. |
| 2020/0206533 A1 | 7/2020 | Laaksonen et al. |
| 2021/0069527 A1 | 3/2021 | Peltola et al. |

OTHER PUBLICATIONS

International Search Report and Written Opinion from International Application No. PCT/EP2023/066849 dated Sep. 11, 2023; 15 pages.

*Primary Examiner* — Jurie Yun
(74) *Attorney, Agent, or Firm* — Fitch, Even, Tabin & Flannery LLP

(57) ABSTRACT

A control circuit accesses a plurality of information items that each correspond to a resultant dose volume histogram shape for a corresponding different radiation treatment plan. The control circuit then trains a machine learning model to predict a desired dose volume histogram shape using that plurality of information items as a training corpus.

14 Claims, 3 Drawing Sheets

MACHINE LEARNING PREDICTION OF DOSE VOLUME HISTOGRAM SHAPES

TECHNICAL FIELD

These teachings relate generally to treating a patient's planning target volume with energy pursuant to an energy-based treatment plan and more particularly to optimizing an energy-based treatment plan.

BACKGROUND

The use of energy to treat medical conditions comprises a known area of prior art endeavor. For example, radiation therapy comprises an important component of many treatment plans for reducing or eliminating unwanted tumors. Unfortunately, applied energy does not inherently discriminate between unwanted material and adjacent tissues, organs, or the like that are desired or even critical to continued survival of the patient. As a result, energy such as radiation is ordinarily applied in a carefully administered manner to at least attempt to restrict the energy to a given target volume. A so-called radiation treatment plan often serves in the foregoing regards.

A radiation treatment plan typically comprises specified values for each of a variety of treatment-platform parameters during each of a plurality of sequential fields. Treatment plans for radiation treatment sessions are often automatically generated through a so-called optimization process. As used herein, "optimization" will be understood to refer to improving a candidate treatment plan without necessarily ensuring that the optimized result is, in fact, the singular best solution. Such optimization often includes automatically adjusting one or more physical treatment parameters (often while observing one or more corresponding limits in these regards) and mathematically calculating a likely corresponding treatment result (such as a level of dosing) to identify a given set of treatment parameters that represent a good compromise between the desired therapeutic result and avoidance of undesired collateral effects.

Radiation treatment planning often begins with clinical goals provided by an oncologist. Such goals are often expressed as statements related to certain points in a dose volume histogram for specific patient volumes. The prior art includes suggestions for automatically creating radiation treatment plans that follow such clinical goals, but in many application settings the applicant has determined that a resultant automatically-created radiation treatment plan may not always be suitable for use. The applicant has determined that the latter can occur, at least in some instances, due to some difficult-to-describe criteria relating, for example, to details in the shape of the dose volume histogram and/or the three-dimensional dose distribution.

BRIEF DESCRIPTION OF THE DRAWINGS

The above needs are at least partially met through provision of the machine learning prediction of dose volume histogram shapes described in the following detailed description, particularly when studied in conjunction with the drawings, wherein.

Figure 1:
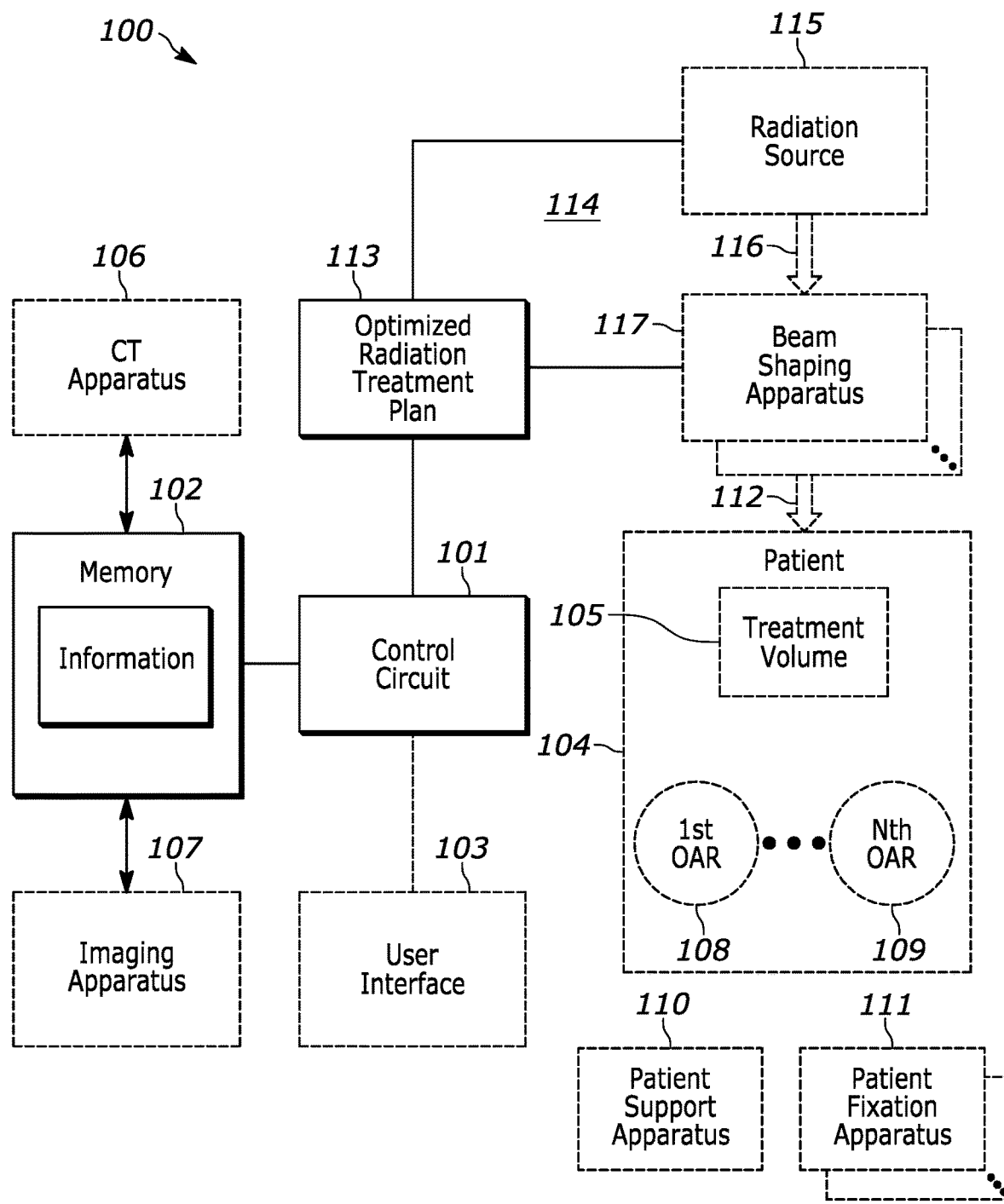
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a control circuit is configured to access a plurality of information items that each correspond to a resultant dose volume histogram shape for a corresponding different radiation treatment plan. The control circuit then trains a machine learning model to predict a desired dose volume histogram shape using that plurality of information items as a training corpus.

By one approach, at least a substantial majority of the different treatment plans each correspond to a radiation treatment plan for a same patient treatment volume. If desired, all of the different treatment plans can each correspond to a radiation treatment plan for a same patient treatment volume.

By one approach, that machine learning model is configured to predict confidence intervals for dose volume histogram variances based, at least in part, on at least one of given clinical metric values and patient anatomy.

By one approach, these teachings will further accommodate accessing at least one clinical goal corresponding to radiation treatment for a patient, then accessing the aforementioned trained machine learning model, and then, while iteratively optimizing a radiation treatment plan for the patient as a function of the at least one clinical goal, predicting information regarding a reference dose volume histogram shape using the machine learning model and using the predicted information of the radiation treatment plan. By one approach, using the predicted information to influence optimization of the radiation treatment plan can comprise, at least in part, using the predicted information to create a cost function term. For example, the latter may comprise using the predicted information to create a cost function term for each structure having an associated clinical goal.

By one approach, predicting the information regarding a reference dose volume histogram shape occurs a plurality of times while iteratively optimizing the radiation treatment plan for the patient.

By one approach, predicting the information regarding a reference dose volume histogram shape comprises, at least in part, generating estimation curves.

By one approach, predicting the information regarding a reference dose volume histogram shape comprises, at least in part, generating information regarding at least one of (or both of) a predicted dose volume histogram curve mean and a predicted dose volume histogram variance.

So configured, these teachings can provide a machine learning-based approach to guiding an optimizer that avoids at least many problems often faced in automatic radiation treatment plan creation by leveraging a set of existing treatment plans to describe a desired dose volume histogram shape. More particularly, these teachings use a set of previous plans to train a machine learning model that can predict the average and variance dose volume histogram curves for given clinical goal values. A cost function utilized in the optimization process can be provided with an additional term that penalizes too-large deviations from the typical dose volume histogram curve by leveraging, for example, the aforementioned predicted variance.

These and other benefits may become clearer upon making a thorough review and study of the following detailed description. Referring now to the drawings, and in particular to FIG. 1, an illustrative apparatus 100 that is compatible with many of these teachings will first be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

The control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to information such as optimization information for a particular patient, information regarding a particular radiation treatment platform, and information items that each correspond to a resultant dose volume histogram shape for a corresponding different radiation treatment plan as described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach the control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

If desired the control circuit 101 can also operably couple to a network interface (not shown). So configured the control circuit 101 can communicate with other elements (both within the apparatus 100 and external thereto) via the network interface. Network interfaces, including both wireless and non-wireless platforms, are well understood in the art and require no particular elaboration here.

By one approach, a computed tomography apparatus 106 and/or other imaging apparatus 107 as are known in the art can source some or all of any desired patient-related imaging information.

In this illustrative example the control circuit 101 is configured to ultimately output an optimized energy-based treatment plan (such as, for example, an optimized radiation treatment plan 113). This energy-based treatment plan typically comprises specified values for each of a variety of treatment-platform parameters during each of a plurality of sequential exposure fields. In this case the energy-based treatment plan is generated through an optimization process, examples of which are provided further herein.

By one approach the control circuit 101 can operably couple to an energy-based treatment platform 114 that is configured to deliver therapeutic energy 112 to a corresponding patient 104 in accordance with the optimized energy-based treatment plan 113. These teachings are generally applicable for use with any of a wide variety of energy-based treatment platforms/apparatuses. In a typical application setting the energy-based treatment platform 114 will include an energy source such as a radiation source 115 of ionizing radiation 116.

By one approach this radiation source 115 can be selectively moved via a gantry along an arcuate pathway (where the pathway encompasses, at least to some extent, the patient themselves during administration of the treatment). The arcuate pathway may comprise a complete or nearly complete circle as desired. By one approach the control circuit 101 controls the movement of the radiation source 115 along that arcuate pathway, and may accordingly control when the radiation source 115 starts moving, stops moving, accelerates, de-accelerates, and/or a velocity at which the radiation source 115 travels along the arcuate pathway.

As one illustrative example, the radiation source 115 can comprise, for example, a radio-frequency (RF) linear particle accelerator-based (linac-based) x-ray source. A linac is a type of particle accelerator that greatly increases the kinetic energy of charged subatomic particles or ions by subjecting the charged particles to a series of oscillating electric potentials along a linear beamline, which can be used to generate ionizing radiation (e.g., X-rays) 116 and high energy electrons.

A typical energy-based treatment platform 114 may also include one or more support apparatuses 110 (such as a couch) to support the patient 104 during the treatment session, one or more patient fixation apparatuses 111, a gantry or other movable mechanism to permit selective movement of the radiation source 115, and one or more energy-shaping apparatuses (for example, beam-shaping apparatuses 117 such as jaws, multi-leaf collimators, and so forth) to provide selective energy shaping and/or energy modulation as desired.

In a typical application setting, it is presumed herein that the patient support apparatus 110 is selectively controllable to move in any direction (i.e., any X, Y, or Z direction) during an energy-based treatment session by the control circuit 101. As the foregoing elements and systems are well understood in the art, further elaboration in these regards is not provided here except where otherwise relevant to the description.

Figure 2:
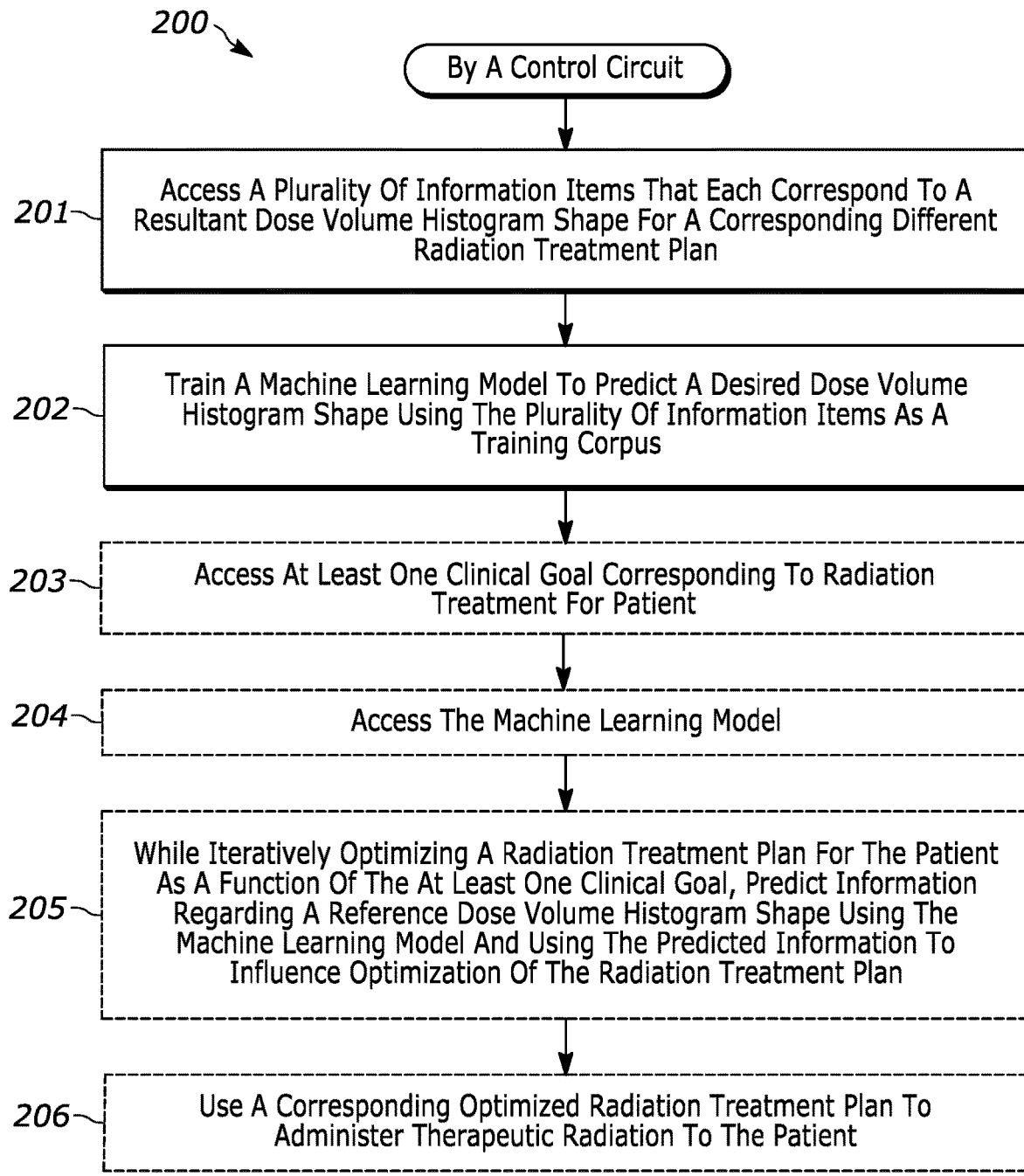
FIG. 2 comprises a flow diagram as configured in accordance with various embodiments of these teachings.

Referring now to FIG. 2, a process 200 that can be carried out, for example, in conjunction with the above-described application setting (and more particularly via the aforementioned control circuit 101) will be described. Generally speaking, this process 200 serves to facilitate generating an optimized radiation treatment plan 113 to thereby facilitate treating a particular patient with therapeutic radiation using a particular radiation treatment platform per that optimized radiation treatment plan.

At block 201, this process 200 provides for accessing a plurality of information items that each correspond to a resultant dose volume histogram shape for a corresponding different radiation treatment plan. For example, a first dose volume histogram shape corresponds to a first radiation treatment plan while a second dose volume histogram shape corresponds to a second radiation treatment plan that is different from the first radiation treatment plan, and so forth. By one approach, all, or at least a substantial majority, of the different radiation treatment plans each correspond to a radiation treatment plan for a same patient treatment volume. For example, all of the radiation treatment plans may correspond to radiation treatment of a breast tumor or a tumor located in a patient's neck area.

Dose volume histograms (often referred to by the acronym DVH) are well known in the art. DVH's typically represent three-dimensional dose distributions in a graphical two-dimensional format (the three-dimensional dose distributions being created, for example, in a computerized radiation-treatment planning system based on a three-dimensional reconstruction of an X-ray computed tomography scan and study). The "volume" referred to in DVH analysis can be, for example, the radiation-treatment target, a healthy organ located near such a target, an arbitrary structure, and so forth.

DVH's are often visualized in either of two ways: as differential DVH's or as cumulative DVH's. With differential DVH's column height for a given dose bin corresponds to the volume of the structure that receives that dose. Bin doses typically extend along the horizontal axis while structure volumes (either percent or absolute volumes) extend along the vertical axis.

A cumulative DVH is typically plotted with bin doses along the horizontal axis but has a column height for the first bin that represents the volume of structure(s) that receive greater than or equal to that dose. The column height of the second bin then represents the volume of structure(s) that receive greater than or equal to that dose, and so forth. With high granularity a cumulative DVH often appears as a smooth line graph. For many application settings cumulative DVH's are preferred over differential DVH's but this process 200 can accommodate either approach.

By one approach, the different radiation treatment plans all correspond to previously approved and administered plans. By another approach, at least some of the different radiation treatment plans may have been previously approved but were not actually administered to a patient. If desired, the different radiation treatment plans may all correspond to a single treatment clinic/facility. By another approach, the different radiation treatment plans may include plans sourced by any of a variety of different clinics/facilities and caregivers.

At block 202, this process then provides for training a machine learning model to predict a desired dose volume histogram shape using the plurality of information items as a training corpus.

Those skilled in the art understand that machine learning comprises a branch of artificial intelligence. Machine learning typically employs learning algorithms such as Bayesian networks, decision trees, nearest-neighbor approaches, and so forth, and the process may operate in a supervised or unsupervised manner as desired. Deep learning (also sometimes referred to as hierarchical learning, deep neural learning, or deep structured learning) is a subset of machine learning that employs networks capable of learning (typically supervised, in which the data consists of pairs (input data, labels) and the aim is to learn a mapping between the input data and the associated labels) from data that is unstructured or, sometimes, even unlabeled. Deep learning architectures include deep neural networks, deep belief networks, recurrent neural networks, and convolutional neural networks. Many machine learning algorithms build a so-called "model" based on sample data, known as training data or a training corpus, in order to make predictions or decisions without being explicitly programmed to do so.

In the present case, and by one approach, the machine learning model can be configured to output confidence intervals for dose volume histogram variances based, at least in part, on at least one of given clinical metric values and patient anatomy. Further description regarding the predictive attributes of the machine learning model are provided below where appropriate.

By one optional approach, this trained machine learning model can be employed while optimizing a radiation treatment plan. An illustrative example in these regards will now be provided. It will be understood that the specific details of this example are intended to serve an illustrative purpose and are not intended to suggest any particular limitations with respect to these teachings.

At block 203, these teachings optionally provide for accessing at least one clinical goal corresponding to radiation treatment for a particular patient. Clinical goals are the treatment goals being prescribed by, for example, the attending oncologist. Examples of clinical goals include, but are not limited to, goals regarding the dose distributions to be achieved with respect to a target volume, one or more organs-at-risk (OAR) in the vicinity of the target volume, or other specified or unspecified normal tissues. By their very nature, clinical goals are typically agnostic with respect to what physical radiation treatment platform serves to administer the radiation.

At block 204, this process 200 can optionally provide for accessing the aforementioned trained machine learning model. Then, at block 205 and while iteratively optimizing a radiation treatment plan for the patient as a function of the at least one clinical goal, the machine learning model serves to predict information regarding a reference dose volume histogram shape. That predicted information can then be used to influence optimization of the radiation treatment plan.

As noted above, this usage of the machine learning model can occur while iteratively optimizing the radiation treatment plan as a function of the at least one clinical goal. Because clinical goals are nonspecific with respect to any particular radiation treatment platform, such clinical goals are ordinarily utilized to inform the specification of optimization objectives that more directly influence the optimization process. Optimization objectives provide a measure by which the process can test or assure that a particular specified dose is being uniformly administered through the patient's target volume while avoiding undue dosing of other patient tissues (or, in other cases, that a series of dose histograms that specify acceptable dosing ranges for a variety of locations both in and external to the target volume are met).

Accordingly, optimization objectives will be understood to be objectives that are very much specifically designed to reflect and accommodate the technical details and specifications of a particular radiation treatment platform, specific details regarding the patient's presentation, and/or other physical details pertaining to a particular application setting. Such details are generally viewed as being outside the expertise and knowledge base of the person who prescribes the radiation treatment in the first place (i.e., for example, a licensed oncologist). As a result, the person prescribing the radiation treatment ordinarily does not also create the optimization objectives.

By one approach, predicting the information regarding a reference dose volume histogram shape per the foregoing occurs a plurality of times while iteratively optimizing the radiation treatment plan for the patient. By one approach, this may comprise predicting such information during each iteration. By another approach, such a fresh prediction may only occur less frequently, such as every other iteration, every fifth iteration, or some other interval of choice. By another approach, the prediction can be redone for each iteration during an initial set of iterations (such as for each of the first through the fifth or the first through the $10^{th}$ iteration) of the optimization process. By yet another approach, in lieu of the foregoing or in combination therewith, the prediction can be redone in response to detecting that a clinical goal metric value has been changed too much during the optimization process. These teachings will accommodate other approaches as well.

By one approach, predicting the information regarding a reference dose volume histogram shape via the machine learning model comprises, at least in part, generating estimation curves.

By one approach, predicting the information regarding a reference dose volume histogram shape comprises, at least in part, generating information regarding at least one (or both) of a predicted dose volume histogram curve mean and a predicted dose volume histogram variance.

As noted above, the predictions from the machine learning model can be used to influence the optimization of the radiation treatment plan. By one approach, this can include using the predicted information to create a cost function term utilized during optimization. Those skilled in the art understand that a cost function is a function that maps an event or values of one or more variables onto a value that represents some "cost" associated with the event. An optimization problem such as the aforementioned radiation treatment plan optimization typically seeks to minimize such a cost function.

By one approach, the cost term is such that a possible penalization is associated with each point in the dose volume histogram curve. By one approach, additional cost function terms can be configured so that any purely improved feature in a dose volume histogram does not lead to a penalty. For example, it may be considered always beneficial to reduce dose in organs-at-risk even if that leads to a situation where the dose volume histogram for that organ at risk looks abnormal. Similarly, and as another example, it may be considered always beneficial when the dose volume histogram for a target volume approaches or achieves a step function shape notwithstanding that such a shape in practice would be unusual. If desired, and depending upon the application setting, it may be beneficial for the cost function term to be differentiable so that the optimizer can employ a cost function gradient.

If desired, the foregoing may include using the predicted information to create a cost function term for each structure (such as, for example, each discrete treatment volume and/or organ at risk) that has an associated clinical goal. For example, these teachings will accommodate creating a cost function term for a treatment volume having an associated clinical goal specifying a minimal radiation dosage and a separate cost function term for an organ-at-risk having an associated clinical goal specifying a maximum radiation dosage.

At block 206, these teachings will accommodate using the corresponding optimized radiation treatment plan 113 to administer therapeutic radiation 112 to the intended patient 104 via the corresponding radiation treatment platform 114.

Figure 3:
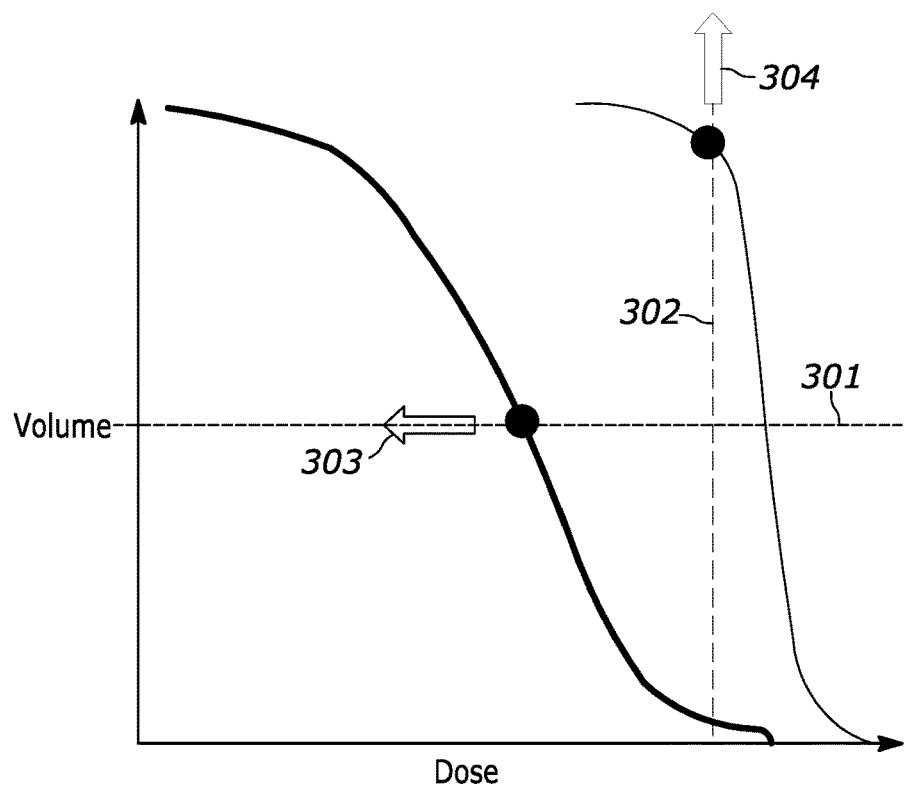
FIG. 3 comprises a graph as configured in accordance with various embodiments of these teachings.
Figure 4:
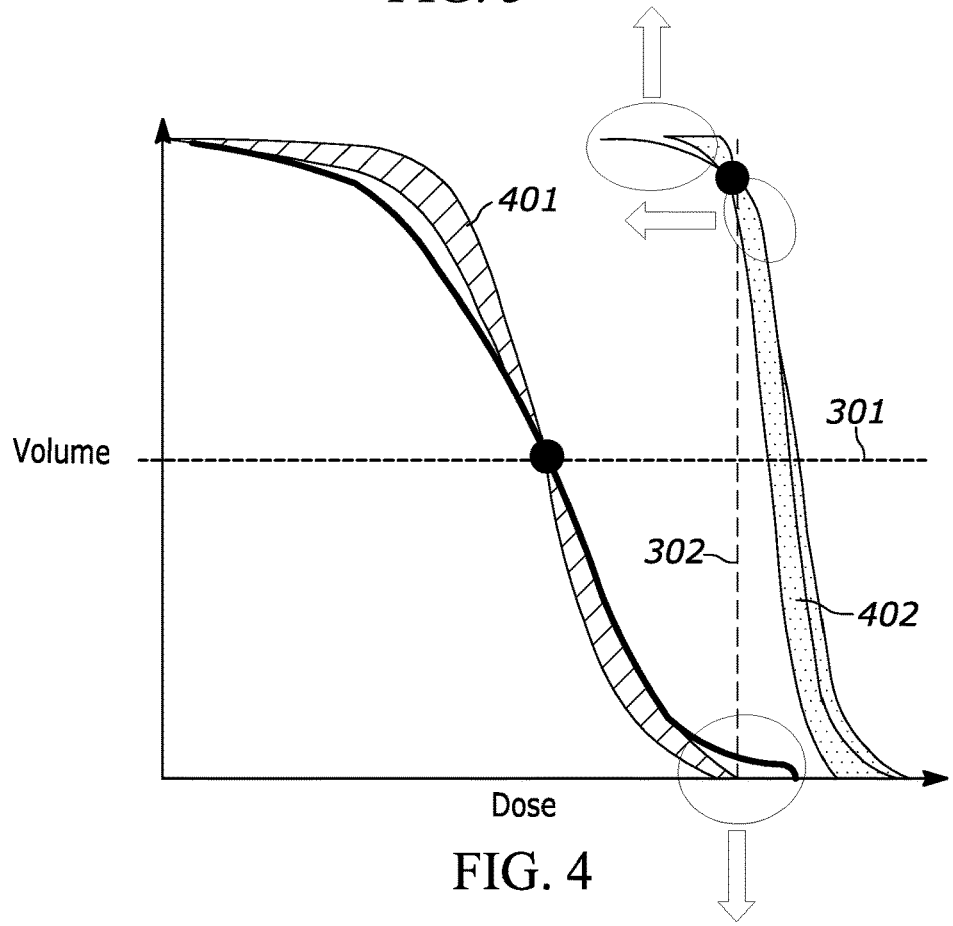
FIG. 4 comprises a graph as configured in accordance with various embodiments of these teachings.

Referring now to FIGS. 3 and 4, a more specific illustrative example will be provided. In this example, the optimization task is presumed to contain only a single target volume (with a corresponding clinical goal expressing desired target coverage) and only a single organ-at-risk with a protocol that expresses goals associated to a dose-to-volume per a certain described volume percentage. In such a case, the cost function could have the following terms:

A first "traditional" term that controls the dose-to-volume of the organ-at-risk, which is denoted by reference numeral 301 in FIGS. 3 and 4;

A second "traditional" term that controls the target coverage, which is denoted by reference numeral 302 in FIGS. 3 and 4; and Two "similarity" terms, one for the target and another for the organ-at-risk.

The optimization process operates to find a radiation treatment plan that minimizes the sum of all four of the foregoing terms. (It may be noted that the exact functional form of the traditional terms (or their relative weights) might be subject to patient-specific variations (where, for example, a particular patient might be more intolerant to side effects as compared to another patient who is willing to assume great risk of adverse side effects) or where the terms might change over time when, for example, new outcome studies are published.)

In this illustrative example, at each iteration of the optimization process dose volume histogram estimation bands are predicted/generated for the organ-at-risk and the target volume. The optimizer calculates the domains where a current solution presents worse than expected performance anywhere on the dose volume histogram. The relative weight of the similarity terms can describe how much it is desired that the dose volume histogram shapes are similar to what is historically observed.

Referring now specifically to FIG. 3, which presents the action of the traditional terms, the horizontal line denoted by reference 301 represents a dose-to-volume type metric used in a cost function term related to the organ-at-risk. The actual functional term of the term can vary depending on, for example, the utilized protocol, whether a biological model is used, and/or just to take into account how the particular patient tolerates certain side effects. The general effect is to reduce the dose associated with the organ-at-risk as represented by the arrow denoted by reference numeral 303. Similarly, the vertical line denoted by reference numeral 302 presents the clinical goal associated with the target volume, with the general effect being to increase the dose associated with the target volume as represented by the arrow denoted by reference numeral 304.

FIG. 4 presents examples for the aforementioned predicted dose volume histogram shapes, a first shape denoted by reference numeral 401 for the organ-at-risk and a second shape denoted by reference numeral 402 for the target volume. These estimates in this example depict that the organ-at-risk has abnormally high maximum dosing causing a penalty in the high-dose region. FIG. 4 also shows that there is an abnormally low volume of lower-mid dose range but since this is considered to be beneficial, this situation is not penalized. Similarly, the prediction range for the target volume dose volume histogram shows abnormalities. Most notably, there is a colder than expected region in the target dose leading to penalization to prompt increasing the dose there. Also, the dose volume histogram line does not drop as quickly as expected after the prescription dose level and this can be penalized during the optimization since any dose beyond the target prescription is considered in this example to not be beneficial.

To collect the total cost, all of the cost terms may be summed together.

So configured, these teachings facilitate predicting and using a desired dose volume histogram shape without a need for tuning an optimization algorithm to contain additional rules as such.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method comprising:
   accessing at least one clinical goal corresponding to radiation treatment for a patient;
   accessing a machine learning model that has been trained with a training corpus comprising a plurality of information items that each correspond to a resultant dose volume histogram shape for a corresponding different radiation treatment plan;
   while iteratively optimizing a radiation treatment plan for the patient as a function of the at least one clinical goal, predicting information regarding a reference dose volume histogram shape using the machine learning model and using the predicted information to influence optimization of the radiation treatment plan, wherein predicting the information regarding a reference dose volume histogram shape occurs a plurality of times while iteratively optimizing the radiation treatment plan for the patient.

2. The method of claim 1 wherein at least a substantial majority of the different radiation treatment plans each correspond to a radiation treatment plan for a same patient treatment volume.

3. The method of claim 2 wherein all of the different radiation treatment plans each correspond to a radiation treatment plan for a same patient treatment volume.

4. The method of claim 1 wherein the machine learning model is configured to predict confidence intervals for dose volume histogram variances based, at least in part, on at least one of given clinical metric values and patient anatomy.

5. The method of claim 1 wherein predicting the information regarding a reference dose volume histogram shape comprises, at least in part, generating estimation curves.

6. The method of claim 1 wherein predicting the information regarding a reference dose volume histogram shape comprises, at least in part, generating information regarding at least one of a predicted dose volume histogram curve mean and a predicted dose volume histogram variance.

7. The method of claim 1 wherein predicting the information regarding a reference dose volume histogram shape comprises, at least in part, generating information regarding at least both of a predicted dose volume histogram curve mean and a predicted dose volume histogram variance.

8. The method of claim 1 wherein using the predicted information to influence optimization of the radiation treatment plan comprises, at least in part, using the predicted information to create a cost function term.

9. The method of claim 8 wherein using the predicted information to create a cost function term comprises using the predicted information to create a cost function term for each structure having an associated clinical goal.

10. The method of claim 1 further comprising:
    using a corresponding optimized radiation treatment plan to administer therapeutic radiation to the patient.

11. An apparatus comprising:
    a control circuit configured to:
    access at least one clinical goal corresponding to radiation treatment for a patient;
    access a machine learning model that has been trained with a training corpus comprising a plurality of information items that each correspond to a resultant dose volume histogram shape for a corresponding different radiation treatment plan;
    while iteratively optimizing a radiation treatment plan for the patient as a function of the at least one clinical goal, predict information regarding a reference dose volume histogram shape using the machine learning model and use the predicted information to influence optimization of the radiation treatment plan, wherein predicting the information regarding a reference dose volume histogram shape occurs a plurality of times while iteratively optimizing the radiation treatment plan for the patient.

12. The apparatus of claim 11 wherein the control circuit is configured to predict the information regarding a reference dose volume histogram shape by, at least in part, generating information regarding at least one of a predicted dose volume histogram curve mean and a predicted dose volume histogram variance.

13. The apparatus of claim 11 wherein the control circuit is configured to use the predicted information to influence optimization of the radiation treatment plan by, at least in part, using the predicted information to create a cost function term.

14. The apparatus of claim 13 wherein the control circuit is configured to use the predicted information to create a cost function term by using the predicted information to create a cost function term for each structure having an associated clinical goal.

\* \* \* \* \*